(12) United States Patent
Delpart-Jannaud et al.

(10) Patent No.: US 8,531,914 B2
(45) Date of Patent: Sep. 10, 2013

(54) METHOD OF IMAGING A TARGET AREA OF THE SUBSOIL FROM WALKAWAY TYPE DATA

(75) Inventors: Florence Delpart-Jannaud, Suresnes (FR); Patrick Lailly, Pau (FR); Ludovic Metivier, Paris (FR)

(73) Assignee: IFP, Rueil-Malmaison (FR)

( * ) Notice: Subject to any disclaimer, the term of this patent is extended or adjusted under 35 U.S.C. 154(b) by 581 days.

(21) Appl. No.: 12/779,978

(22) Filed: May 14, 2010

(65) Prior Publication Data

US 2010/0296367 A1 Nov. 25, 2010

(30) Foreign Application Priority Data

May 20, 2009 (FR) ...................................... 09 02531

(51) Int. Cl.
*G01V 1/00* (2006.01)
(52) U.S. Cl.
USPC .................................. 367/56; 367/57; 702/14
(58) Field of Classification Search
USPC ........................ 367/57, 56; 702/14
See application file for complete search history.

(56) References Cited

U.S. PATENT DOCUMENTS

| | | | | |
|---|---|---|---|---|
| 4,214,226 A | * | 7/1980 | Narasimhan et al. | 367/27 |
| 4,415,999 A | * | 11/1983 | Moeckel et al. | 367/73 |
| 6,026,054 A | * | 2/2000 | Lee | 365/236 |
| 6,028,821 A | | 2/2000 | Boelle | |
| 7,092,823 B2 | | 8/2006 | Lailly et al. | |
| 7,894,299 B2 | * | 2/2011 | Meier | 367/50 |

FOREIGN PATENT DOCUMENTS

| | | |
|---|---|---|
| EP | 0 909 961 A2 | 4/1999 |
| FR | 2 843 202 | 2/2004 |
| WO | WO 2004/031805 A1 | 4/2004 |

OTHER PUBLICATIONS

Delprat-Jannaud, Florence, et al: "A Fundamental Limitation for the Reconstruction of Impedance Profiles from Seismic Data", Geophysics, vol. 70, No. 1, Feb. 2005, pp. R1-R14, XP002563120.
Mace, D., et al: "Solution of the One-Dimensional Inverse Problem", Geophysical Prospecting, vol. 34, 1986, pp. 1002-1021, XP002563121.
Metivier, Ludovic, et al: "2D Nonlinear Inversion of Walkaway Data", SEG International Exposition and Annual Meeting, Oct. 25, 2009, XP002563122.

* cited by examiner

*Primary Examiner* — Mark Hellner
(74) *Attorney, Agent, or Firm* — Antonelli, Terry, Stout & Kraus, LLP.

(57) ABSTRACT

A method of imaging a target area of the subsoil from "walkaway" data having application to development of oil reservoirs or monitoring of geologic storage sites is disclosed. After acquisition of seismic data of walkaway type and estimation of the rate of propagation of the seismic waves in the subsoil, p illumination angles are selected. The seismic measurements are then converted to data $D_p$ by illumination angle. The distribution of acoustic impedances best explaining data $D_p$ is determined within the target by using a nonlinear inversion which minimizes a difference between the data $D_p$ obtained from measurements and data by illumination angle resulting from an estimation. This estimation is performed by solving a wave propagation equation from the velocity field, an acoustic impedance distribution and a pressure distribution at the level of the top of the target for each illumination angle.

25 Claims, 7 Drawing Sheets

METHOD OF IMAGING A TARGET AREA OF THE SUBSOIL FROM WALKAWAY TYPE DATA

BACKGROUND OF THE INVENTION

1. Field of the Invention

The present invention relates to subsoil exploration from seismic data.

The invention concerns seismic data processing allowing providing of a high-resolution image of the subsoil. Such an image is used in the sphere of petroleum exploration and production, or of geologic $CO_2$ storage site monitoring.

2. Description of the Prior Art

In the petroleum industry and for $CO_2$ storage site monitoring, it is very important to have precise images of the subsoil. Precision is defined in terms of resolution. The higher the resolution, the more data on the structure or the composition of the subsoil in the image. It is desired to construct, "high-resolution" images of the subsoil, whether considered to be static (case of petroleum exploration) or dynamic (case of underground reservoir monitoring).

Measurements are performed within the subsoil in order to establish an image thereof. Two main types of measurement are conventionally used: measurements within wells drilled through the formation and seismic surveys. The first ones allow perfectly defining the properties of the subsoil, either through coring or through logging (continuous measurement of various properties of the subsoil along the well), then interpretations of the logs are thus obtained. The information is precise but highly localized around the well. On the other hand, seismic data play a role by imaging a large volume of the subsoil, but the information is less precise and the resolution lower.

However, many techniques have been developed to improve the precision of the information obtained from seismic data. In particular, seismic quantitative imaging methods intended for estimation of the distribution of certain parameters in the subsoil, such as the acoustic impedance or parameters linked with the impedance, represent a significant advance in comparison with the way a conventional seismic image is obtained. Of course, the quality of the result provided by these methods is all the higher as the resolution of the image directly resulting from seismic data is high.

Between these two main types of measurement, there are seismic well data acquisition methods. They emit seismic waves in the subsoil and record the response (notably reflections) of the subsoil with receivers arranged in a well.

One example of such well survey techniques is the "walk-away" type acquisition method. This technique is for example described in:

Mari J.-L., Glangeaud F., Coppens F., 1997, "Traitement du Signal Pour Géologues et Géophysiciens", ÉditionsTechnip.

As illustrated in FIG. 1, a walkaway acquires seismic data by arranging seismic sources $(S_1, S_2, \ldots, S_p)$ at the surface, generally in a rectilinear layout through the well, and seismic receivers $(R_1, R_2, \ldots, R_n)$ in the well, at various depths. In this figure, x represents a geographic direction and z represents depth.

FIG. 4 shows typical data obtained by this type of acquisition. These data show a downgoing wave train having many arrivals: the first arrival does not really dominate the following ones (referred to as second arrivals). This observation provides the guiding line of the standard seismic well data processing: it is based on a separation of the data into upgoing waves and downgoing waves, followed by a deconvolution of the first by the second.

This approach however rests on a 1D view of the propagation of waves, which is not really realistic, especially for data where the source is not vertical to the well.

As soon as the wave propagation occurs in directions other than the vertical, an estimation of the velocity distribution is essential for processing. In the event that the earth is considered to be a 1D medium, extensions to the processing presented above have been proposed which are based on the application of dynamic corrections (offset correction or NMO).

This concept does however not account for the seismic events generated by the second arrivals. In fact, the correction to be applied to these events is in no way intrinsic and it depends on the event. If there were no second arrivals and, more generally, no multiple reflections, which is not a really realistic hypothesis, seismic well data imaging could be achieved by a simple migration of the records, and the velocity distribution would have been estimated beforehand. If certain precautions have been taken, an estimation of the subsoil reflectivity (quantity linked with the impedance) would thus be obtained. However, due to the particular illumination of the medium (linked with an acquisition device located in a well), the result contains distortions, as illustrated in FIG. 1, whereas the desired subsoil model, illustrated in FIG. 3, is practically a 1D model.

The following document presents known techniques for seismic well data processing: Bob A. Hardage, Collection Handbook of Geophysical Exploration, Geophysical Press, 1985.

Thus, the prior art techniques have difficulty reconciling accounting for multiple reflections with multi-dimensional propagation and, all the more, in media other than 1D media. Besides, these imaging techniques use linear processes (deconvolution or migration), which consequently limits the resolution of seismic images to the seismic frequency band (of the order of $\lambda/2$ if $\lambda$ is the seismic wavelength).

The present invention is a method of constructing an image of the subsoil by accounting for the multiple reflections as well as the multi-dimensional character of the propagation. Furthermore, through the use of a non-linear imaging technique, the invention substantially improves the vertical resolution and notably goes well beyond the seismic frequency band (from $\lambda/2$ to $\lambda/10$ depending on the heterogeneity of the sediments).

Moreover, the invention relates to a method of constructing an image representative of a distribution of acoustic impedances in an area of the subsoil, by seismic measurements acquired with a configuration comprising an emission of seismic waves from the surface into the subsoil and the reception thereof by receivers positioned at different depths in at least one well. The method also requires an estimation of the seismic wave propagation velocity field in the subsoil. The method comprises the following:

selecting p illumination angles, each illumination angle corresponding to a direction of propagation of a wave front at the level of an upper limit of an area;

organizing seismic measurements into data $D_p$ organized by illumination angle p;

determining, within the area, an acoustic impedance distribution by an inversion, wherein a difference between the data $D_p$ obtained from the seismic measurements and data resulting from an estimation is minimized by an equation of wave propagation from a velocity field, an acoustic impedance distribution and a pressure distribution at the level of said upper limit of the area for each illumination angle.

In order to minimize the difference, a priori information defined by a direction of a dip concerning a structuration of the acoustic impedance distribution, and a direction of a dip concerning a structuration of the pressure distribution can be taken into account. It is therefore possible to minimize a least-squares function comprising: a first term measuring the difference, a second term corresponding to a directional derivative concerning the structuration of the acoustic impedance distribution and weighted by a weight $\epsilon_I$, and a third term corresponding to a directional derivative concerning the structuration of the pressure distribution and weighted by a weight $\epsilon_{B,P}$. The weights can be determined by a trial-and-error technique. The following rules can also be applied:
a result showing too strong correlated residues express too strong a value of at least one of the two types of weight; and
a result showing an acoustic impedance distribution with abnormally weak lateral variations which expresses too great a value assigned to weight $\epsilon_I$.

According to the invention, a term can be added to the function to take into account a priori information determined at the level of at least one well drilled through the area.

In order to organize the seismic data into data by illumination angle, a Radon transform can be used.

According to the invention, the image can be interpreted in lithologic and/or petrophysical terms, so as to monitor a geologic acid gas storage site or to locate and assess oil reservoirs. The image can also be used as a complement to other logs so as to characterize the area.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION

For clarity reasons, the method is described in a 2D context, generalization to three dimensions being immediate.

Figure 1:
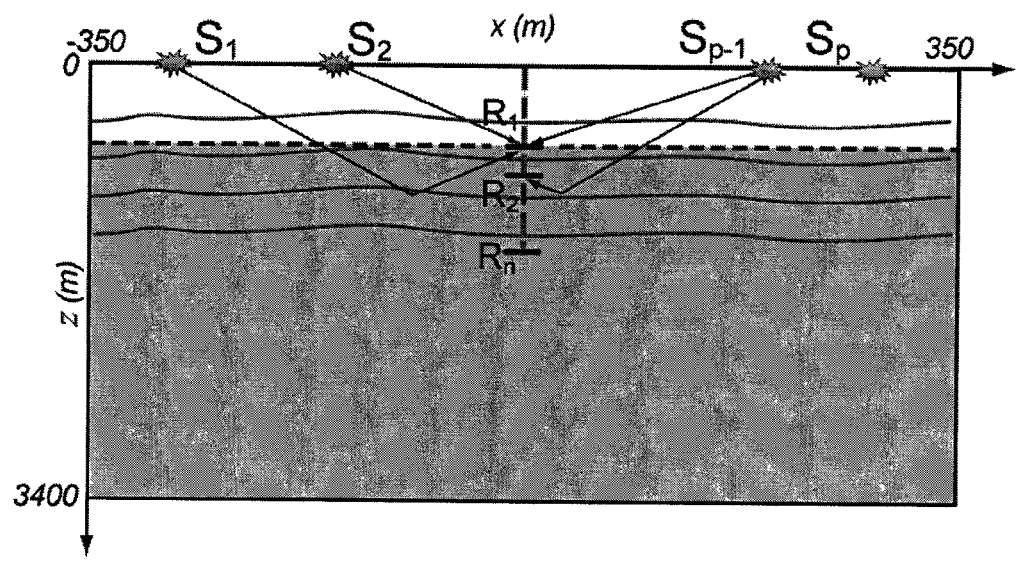
FIG. 1 illustrates the "walkaway" type acquisition configuration.

What is referred to as the target is the part of the subsoil to be characterized by a high-resolution image by means of a walkaway type acquisition of seismic data (FIG. 1).

Figure 2:
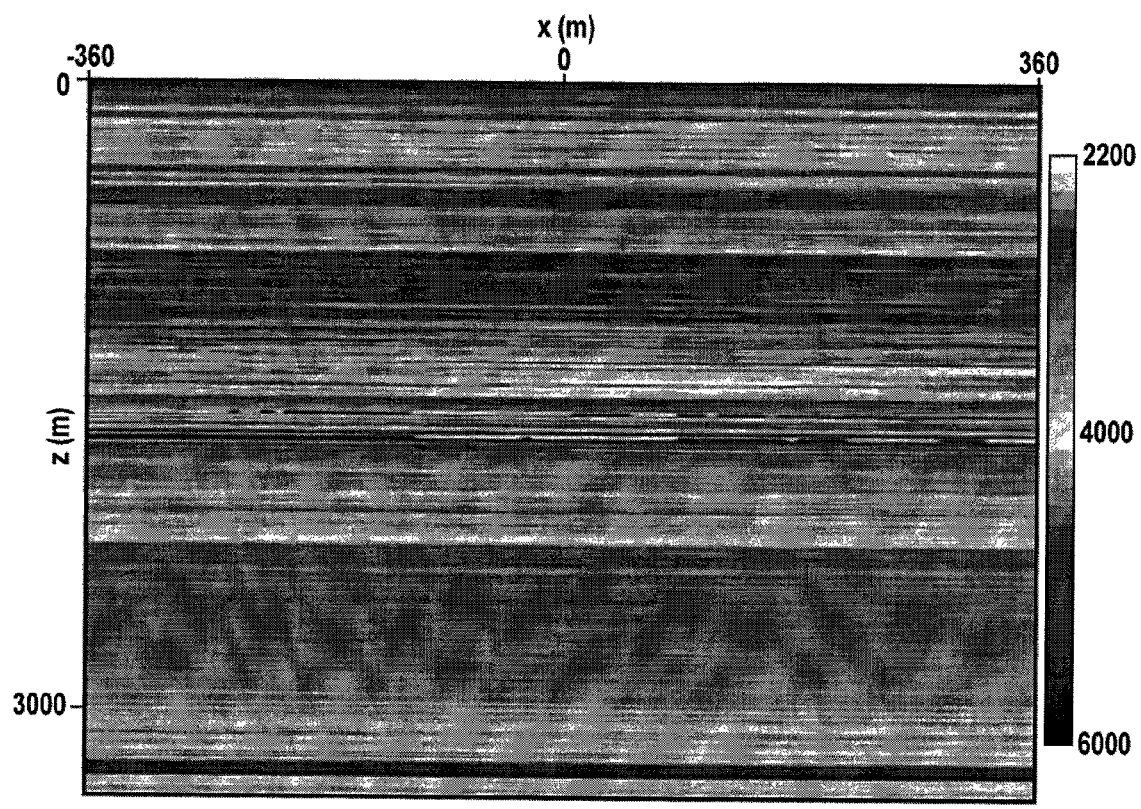
FIG. 2 shows a velocity distribution of the waves in the subsoil, in a direction X and depth Z.
Figure 3:
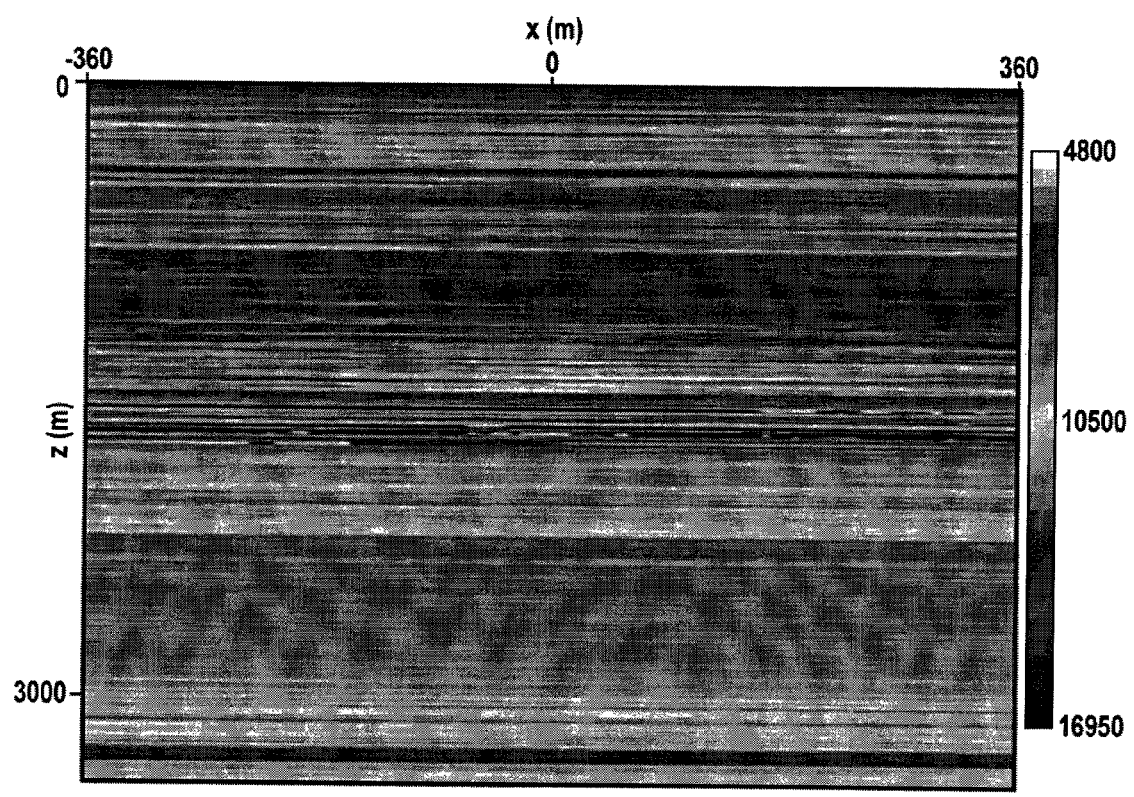
FIG. 3 shows an acoustic impedance distribution in the subsoil, in a direction X and depth Z.

A two-dimensional target has the impedance and velocity distributions respectively shown in FIGS. 2 and 3. The method reconstructs the acoustic impedance distribution by a high-resolution image, from walkaway type data and an estimation of the propagation velocity distribution of the P waves in the subsoil.

FIG. 1 shows a walkaway type acquisition configuration. According to an implementation example, a hundred receivers ($R_1$, . . . ) are arranged in the well (assumed to be vertical according to the example and shown by a dotted vertical line in FIG. 1) every 8 meters, between depths 1000 m and 1800 m. The depth is denoted by z, it is expressed in meters. The method is presented in the case of a vertical well, but it can be readily adapted to deflected wells or to the multiwell case. Fifteen sources ($S_1$, . . . ) are arranged in the vicinity of the surface, at a distance of 45 m from one another. These sources symmetrically cover, with respect to the well, a 630-m wide interval. The upper limit of the target is referred to as the top. The top of the target, represented in dotted line in FIG. 1, is defined by the user of the method but it has to pass through, or in the vicinity of, the least deep receiver (receiver $R_1$ in FIG. 1). Thus, the depth of the shallowest deep receiver, $R_1$, defines the surface below which the method constructs an image of the subsoil, representing the distribution of the acoustic impedances. On the other hand, the top is not necessarily horizontal or even plane. The target stops at a depth depending, among other things, on the duration of the seismic traces which are recorded. Thus, the subsoil includes the target as well as the formations located above.

Figure 4:
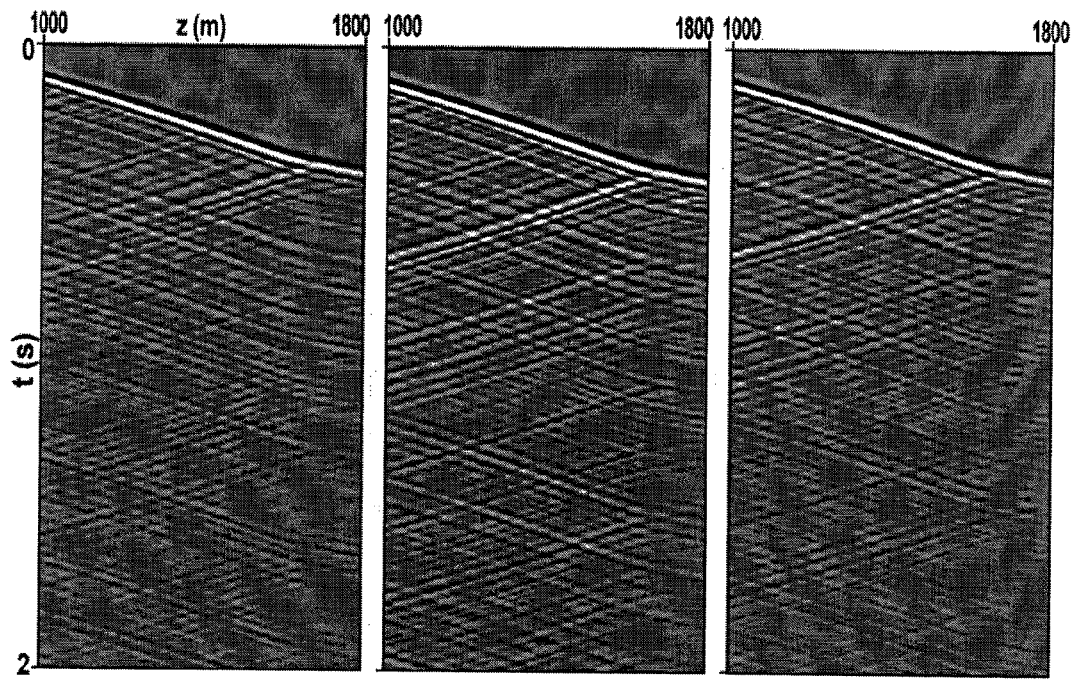
FIG. 4 shows three shotpoint gathers (associated with sources located at x=−315, x=0 and x=+315 m) extracted from walkaway data.

FIG. 4 shows three shotpoint gathers (associated with sources located at x=−315, x=0 and x=+315 m) extracted from walkaway data. The measurement is here the vertical component of the displacement velocity measured at each pickup. These data have been calculated by numerical solution of the acoustic wave equation in 2D. To illustrate the method, the velocity distribution used is that of the target, i.e. the velocity distribution illustrated in FIG. 2. The seismic wavelet used for this modelling is a Ricker signal (second derivative of a Gaussian centered on 25 Hz).

Thus, from the propagation velocity distribution of the P waves in the subsoil, which is estimated beforehand, and from the walkaway type data, which is acquired, the method reconstructs an acoustic impedance distribution.

Direct Problem

In order to determine the high-resolution image, the method comprises simultaneously seeking the impedance distribution within the target and seismic excitations by illumination angle. This search is achieved by solving an inverse problem. Before describing the inverse problem, the direct problem associated therewith is described.

The acoustic wave equation is considered that describes, from zero initial conditions, the evolution, starting from an initial state where the medium is at rest, of the pressure field as a function of time within the target. Since the velocity field is known, this pressure field P(x,z,t) is completely described once the following is specified:
the acoustic impedance distribution I(x,z);
the boundary conditions at the top of the target. According to an embodiment example, a Dirichlet type boundary condition is used with the pressure value at the top of the target as a function of lateral coordinate x and time t. This boundary condition is denoted by B(x,t). This boundary condition characterizes the illumination of the target.

More precisely, P is the solution to the wave equation that is written as follows wherein c(x,z) designates the propagation velocity distribution:

$$\frac{1}{1c}\frac{\partial^2 P}{\partial t^2} - \nabla\left(\frac{c}{I}\vec{\nabla}P\right) = 0 \text{ in the target and for } t \geq 0$$

with the boundary condition: P=B(x,t) at the top of the target and the initial conditions: P=0 for t≦0.

This acoustic wave equation corresponds to the time evolution equation (in contrast with the writing in the time frequency domain leading to the Helmholtz equation) and, furthermore, in its simplest form, notably without taking account of the attenuation. Modifications in the writing of the wave equation only require adaptation of the numerical method used for its solution (and for the calculation of the gradient of the least-squares functional if an optimization method based on this calculation is used).

The fact that the pressure field within the target is completely determined, once the impedance distribution and the boundary condition at the top of the target specified, allows to consider the pressure field within the target as a function of I(x,z) and B(x,t), and leads to introduce the following modelling operator F:

$$F:(I(x,z),B(x,t)) \rightarrow P(x,z,t)$$

It can be noted that operator F is non linear in the impedance distribution. Consequently, for a given boundary condition, the seismic response to the sum of two impedance distributions is not the sum of the seismic responses associated with each impedance distribution. In practice, one needs to evaluate, for given pairs (I(x,z),B(x,t)), the image by F of these pairs: this operation is carried out by numerical solution of the wave equation, using the finite-difference method (for example K. R. Kelly, et al., 1976, "Synthetic seismograms: a finite-difference approach", Geophysics, 41, 2), or the finite-element method (for example Kurt J. Marfurt, 1984, "Accuracy of finite-difference and finite-element modeling of the scalar and elastic wave equations", Geophysics, 49, 533).

Inverse Problem

Now the associated inverse problem is considered:

Through the agency of the walkaway type data, we have measurements linked with the pressure field in the target. According to an example, we use components $u^x(t)$ and $u^z(t)$ of the displacement velocity generated by the pressure field. These velocities are directly measured when using geophones as the receivers. It would also be possible to use a measurement concerning a time derivative or integral of these quantities (for example acceleration or displacement itself). The pressure measured by the pickup, if the latter is a hydrophone, could also be directly used.

The data vector is denoted for $D_p$ for each illumination angle p. Let O be the observation operator, that is the operator that associates measurements $D_p$ with the pressure field within the target P(x,z,t). Euler's equations can for example be used for this operator O:

$$\frac{\partial u_x}{\partial t} - \frac{c}{I}\frac{\partial p}{\partial x} = 0$$

$$\frac{\partial u_z}{\partial t} - \frac{c}{I}\frac{\partial p}{\partial z} = 0$$

$$\frac{\partial p}{\partial t} - \frac{c}{I}\frac{\partial u_x}{\partial x} - \frac{c}{I}\frac{\partial u_z}{\partial z} = 0$$

The inverse problem determines the acoustic impedance distribution I(x,z) and the various boundary conditions $B_p(x,t)$ from the collection of the various $D_p$.

The method mainly comprises the following:

1. Constructing data collections $D_p$ for each illumination angle;
   a. Selecting a series of illumination angles for the target
   b. Converting the shotpoint gathers to data by illumination angle
2. Determining a priori information concerning a dip of the deposits within the target
3. Simultaneously seeking I(x,z) within the target and the various boundary conditions $B_p(x,t)$ by illumination angle.

Stage 1: Constructing Data Collections $D_p$ for each Illumination Angle a. Selecting a Series of Illumination Angles for the Target What is referred to as "illumination angle" is the direction of propagation of a wave front at the top of the target. In two dimensions, this direction is defined by the angle formed with the vertical. In three dimensions, the illumination angle is defined by a slope (angle formed with the vertical) and an azimuth.

In order to keep the same amount of information during the next stage of conversion of shotpoint gathers to data by illumination angle, as many angles as there are shotpoints are selected (but this choice is not essential). According to an example, the angles are selected cover the interval −10°, +10°. With the interpretation of the surface survey revealing a nearly 1D structure, it is natural to select illumination angles centered on 0°.

b. Converting the Shotpoint Gathers to Data by Illumination Angle

For each one of the illumination angles that is selected, the shotpoint gathers are converted to data by illumination angle.

Shotpoint gathers are the raw data resulting from walkaway type acquisition. It is a data organization which is well known.

These data by illumination angle, denoted by $D_p$, are defined as the seismic response of the target to a seismic excitation by illumination angle, corresponding to a wave field that, at the level of the shallowest receiver(s), has a succession of wave fronts corresponding (more or less) to the specified illumination angle.

The basic process is to carry out a Radon transform on the shotpoint gathers (a technique referred to as slant stack). Such a technique is for example described in the following documents:

L. Lu and G. F. Gardner, 1991, "Slant-Stack Processing", SEG Books, 1

J. F. Clarbout, 1985, "Imaging the Earth's Interior", Blackwell scientific publications.

Figure 5:
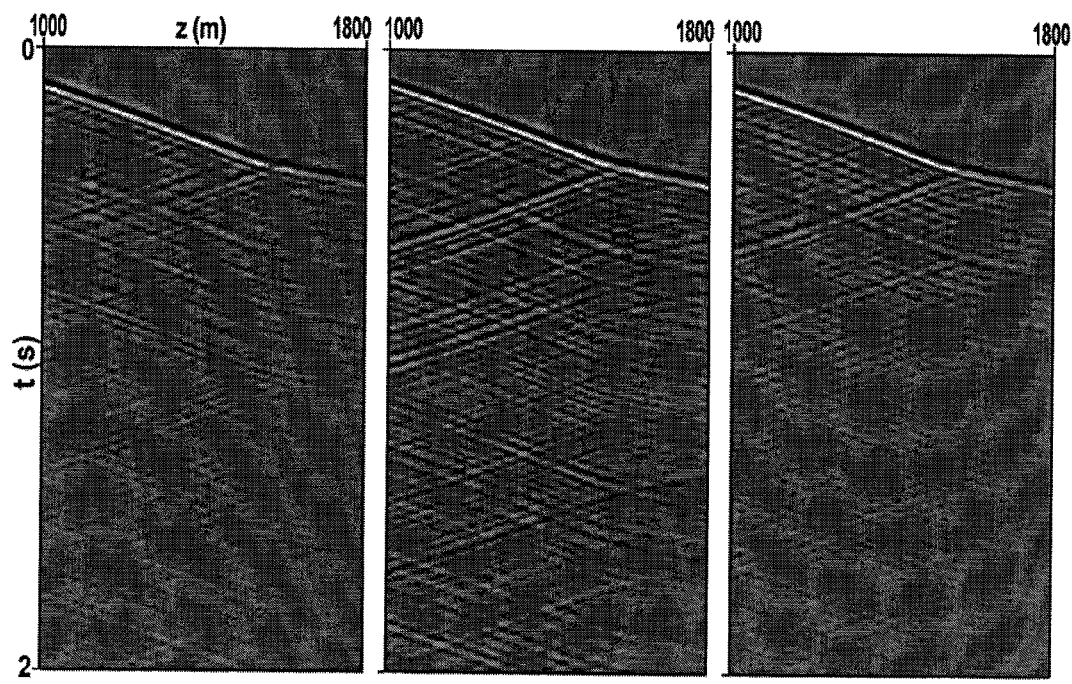
FIG. 5 shows, for illumination angles of −10°, 0° and 10°, the result of the Radon transform (slant stack) of the shotpoint gathers making up the walkaway data of FIG. 4.

This technique converts the seismic response measured by a pickup for various positions of the seismic source to the response to a plane wave excitation propagated from the surface in a given direction. This technique has been used to obtain the gathers by angle shown in FIG. 5. FIG. 5 shows, for illumination angles of −10°, 0° and +10°, the result of the Radon transform (slant stack) applied to the shotpoint gathers that make up the walkaway data.

In this case, the illumination angle is generally different from the angle defined when applying the slant stack technique, but the relation between therebetween can be calculated for example by plane wave ray tracing. In the case of significant lateral variations of the propagation velocity in the medium above the target, the plane wave sent to the surface may notably have been deformed upon its arrival on the top of the target. In this case, a more refined approach, such as the controlled illumination technique described in the following document, is preferably used:

W. E. A. Rietveld and A, J. Berkhout, 1994, "Prestack Depth Migration by Means of Controlled Illumination", Geophysics, 59, 801.

Stage 2: Determining a Priori Information Concerning the Dip of the Deposits within the Target This information is provided by an interpretation (seismic picking), on the surface survey, of the seismic events corresponding to the sedimentary layers that make up the target. According to an example, the a priori model considers a horizontally stratified model. It can be recalled that, for extension to the 3D case, in 3D a dip is defined by a slope and an azimuth. This information on the dip characterizes:

the lithologic structuration of the acoustic impedance distribution, and the structuration of the various boundary conditions.

These functions (impedance or boundary conditions) are supposed to slightly vary in directions that can be predicted (and which depend, for the boundary conditions, on illumination angle p).

Thus, a direction of dip is defined concerning the structuration of the impedance distribution (note that this direction can depend on the point, that is the pair (x,z) considered), and a direction of dip is defined concerning the structuration of the boundary condition (note that this direction can depend on the point, that is the pair (x,t) being considered).

Stage 3: Simultaneously Seeking Impedance Distribution I(x,z) within the Target and Boundary Conditions $B_p(x,t)$ by illumination angle Simultaneously, the impedance distribution I(x,z) (or any other parameter related to the impedance) is sought within the target and the various boundary conditions $B_p(x,t)$ by illumination angle (seismic excitations).

This search is carried out by minimizing, over all the illumination angles considered, the difference between the data by illumination angle $D_p$ and the seismic response of the target. This seismic response is considered as a function of this impedance distribution I(x,z) and of boundary condition $B_p(x,t)$ for the illumination angle p being considered:

$$O \circ F(I(x,z), B_p(x,t))$$

Thus, $D_p$ corresponds to the measured seismic data and $O \circ F(I(x,z), B_p(x,t))$ corresponds to these data calculated as a function of unknowns I(x,z) and $B_p(x,t)$.

This minimization is performed by taking into account the a priori information available (stage 2) concerning I(x,z) and $B_p(x,t)$. It is possible to quantify the difference in relation to this a priori information according to a technique for evaluating norm $L^2$ of directional derivatives concerning the functions concerned: I(x,z) or $B_p(x,t)$.

The acoustic impedance distribution I(x,z) and the boundary conditions $B_p(x,t)$ associated with the various illumination angles that best explain data $D_p$ while satisfying the a priori information are sought.

Therefore, these quantities are sought which achieve the minimum of the least-squares functional:

$$J(I, \{B_p\}) = \sum_p \|D_p - O \cdot F(I, B_p)\|_{D,p}^2 + \varepsilon_I \|\partial_I I\|^2 + \sum_p \varepsilon_{B,p} \|\partial_p B_p\|_{B,p}^2$$

where:

$\{B_p\}$ designates all the boundary conditions we want to find for each illumination angle p;

$\| \|_{D,p}$ designates the norm in the data space for illumination angle p;

$\| \|$ designates the norm of $L^2$ type possibly weighted (or Euclidean in case of the discrete quantity approach) in the space of the functions defined on the target area;

symbol $\partial_I$ designates the directional derivative selected upon specification of the a priori information concerning the structuration of the impedance distribution (note that the direction can depend on the point, that is the pair (x,z) considered);

$\| \|_{B,p}$ designates the norm of $L^2$ type possibly weighted (or Euclidean in case of the discrete quantity approach) in the space of the functions of x and t where the boundary conditions are defined for illumination angle p;

symbol $\partial_p$ designates the directional derivative selected upon specification of the a priori information concerning the structuration of the boundary condition (note that the direction can depend on the point, that is the pair (x,t) considered);

$\varepsilon_I$ designates a regularization weight expressing the confidence in the a priori information concerning the structuration of the impedance distribution;

$\varepsilon_{B,p}$ designates a regularization weight expressing the confidence in the a priori information concerning the structuration of the boundary condition.

The search for this minimum can be carried out using conventional optimization techniques such as those described, for example, in the following document:

J. Nocedal and S. J. Wright, 1999, "Numerical Optimization", Springer.

By way of example, the minimum of the least-squares function can be determined by optimization methods referred to as descent methods: these iterative methods construct a series of "pairs" $(I, \{B_p\})$ causing a decrease in the functional value of the next iteration being constructed by exploiting the gradient of the function at the iteration being considered.

As for the selection of regularization weights $\varepsilon_I$ and $\varepsilon_{B,p}$, it can be made by trial-and-error, guided by the rule that the objective is to ultimately obtain an impedance distribution in accordance with the sedimentologist's expectations and reasonable residues (that is the difference $D_p - O \circ F(I, B_p)$) from the geophysicist's point of view.

Figure 6:
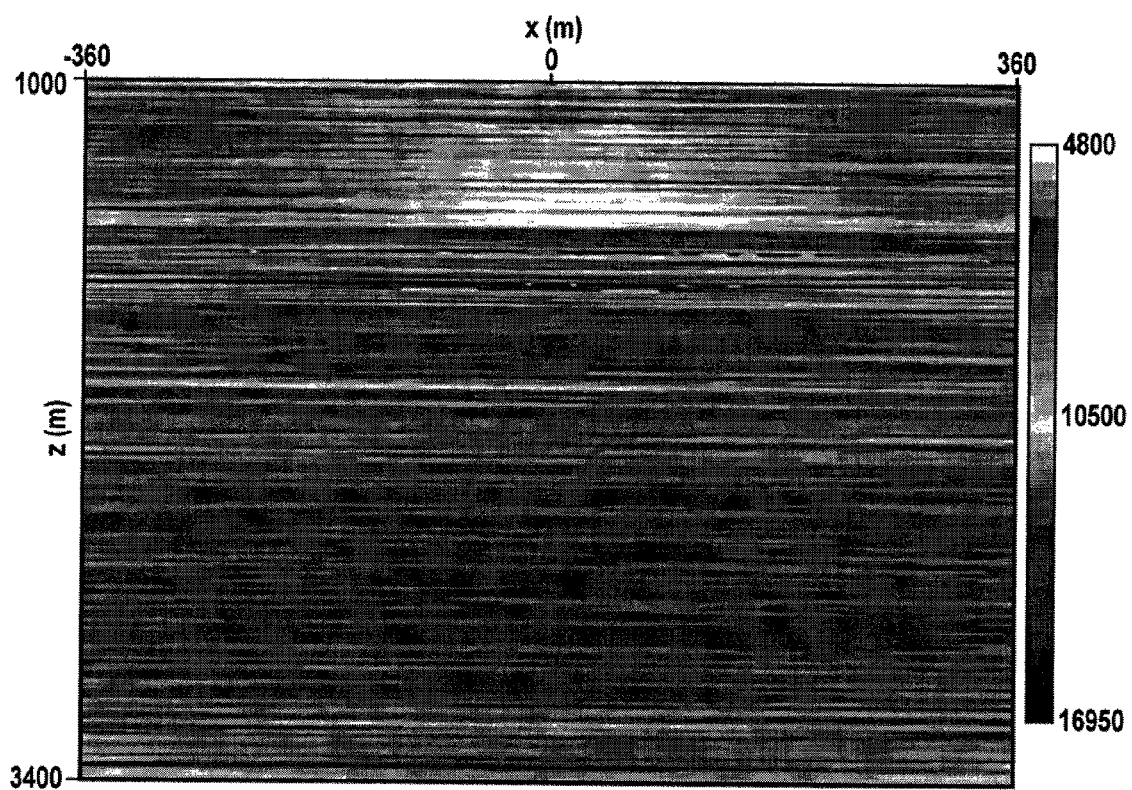
FIG. 6 shows the reconstructed impedance distribution.

In the example presented, by applying the method according to the invention with identical values of $\varepsilon_{B,p}$ for the various p, the impedance distribution shown in FIG. 6 can be obtained. The latter shows a structure in accordance with specifications, while exhibiting realistic lateral variations.

Figure 8:
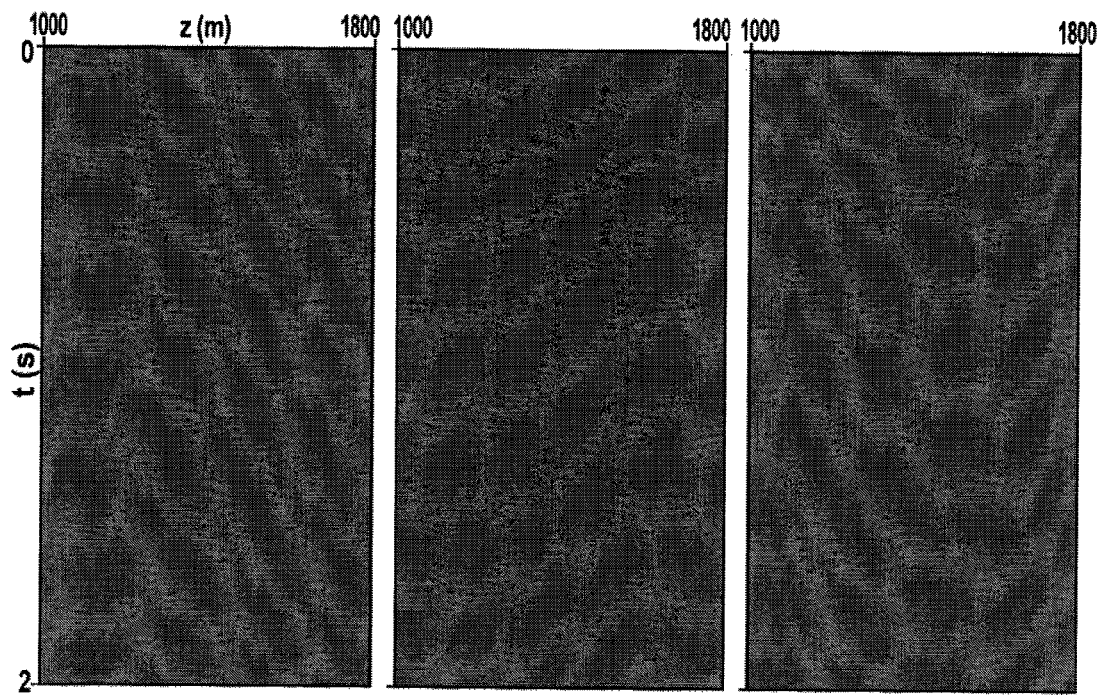
FIG. 8 shows the residues associated with illumination angles of −10°, 0° and 10°.

FIG. 8 shows the residues associated with illumination angles of $-10°$, $0°$ and $+10°$. The gain applied for the graphical representation is the same as the gain used for FIG. 5.

Figure 9:
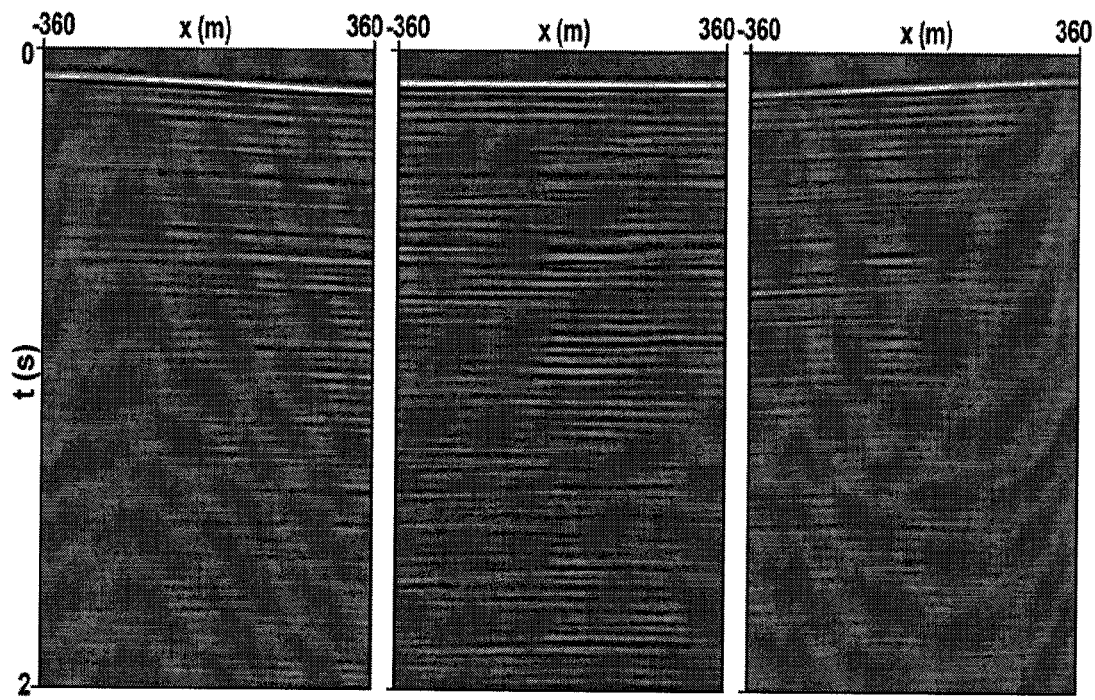
FIG. 9 shows the reconstructed boundary conditions for illumination angles of −10°, 0° and 10°.

FIG. 9 shows the reconstructed boundary conditions for illumination angles of $-10°$, $0°$ and $+10°$. These boundary conditions satisfy the illumination angle-dependent regularity condition. The many disagreements between the result and the regularity condition integrated into the least-squares function illustrates the robustness of the method insofar as the normalization weights have been well selected.

The residues illustrated in FIG. 8 appear to be negligible despite non insignificant divergences in relation to the specified a priori information concerning the reconstructed boundary conditions (FIG. 9): the values selected for the two types of weight have suitably managed conflicts between the various data handled (seismic data by illumination angle, a priori information on the structuration of the impedance distribution, a priori information on the structuration of the boundary conditions).

In order to reach the goal that is sought and to correct a bad estimation of the values to be assigned to the weights, the following rules can be applied:
a result showing too strong correlated results expresses too strong a value of at least one of the two types of weight; and
a result showing an acoustic impedance distribution having an abnormally weak lateral variations expresses too strong a value assigned to weight $\epsilon_f$.

Other data, such as logs and sedimentologic knowledge, can be taken into account as a priori information. These data can be used by additional terms integrated in the least-squares function, via appropriate parametrization, constraints allowing limiting of the space of the impedance distributions . . . .

Other techniques for integrating the a priori information can be considered. For example, it is possible to constrain the quantities sought (impedance distribution and boundary conditions) to satisfy the a priori information by a parametrization allowing only distributions in accordance with the a priori information.

Variants

According to an embodiment, other boundary conditions than the

Dirichlet ones at the top of the reservoir are used.

The downgoing wave train can for example be specified by non-homogeneous "absorbent" boundary conditions of $$\frac{1}{c}\frac{\partial P}{\partial t} + \frac{\partial P}{\partial z} = B_0(x, t)$$

type or, more precisely, the version extended to the case of an impedance which is heterogeneous because of the heterogeneity of the density, as explained in the following document:
B. Chalindar, 1988, <<Conditions aux Limites Absorbantes Appliquées à des Problèmes Hyperboliques Intervenant en Sismique>>, Thèse, Université de Saint Etienne.

A condition of this type has in fact to be adapted according to the illumination angle and to the local slope of the top of the target.

Higher order absorbent boundary conditions can also be used as described in:
Robert W. Clayton and Bjorn Engquist, 1980, <<Absorbing Boundary Conditions for Wave—Equation Migration>>, Geophysics, 45, 895.

The use of other boundary conditions simply requires adapting the numerical method used for solving the wave equation (and for calculation of the gradient of the least-squares function if an optimization method based on this calculation is used).

According to another embodiment, illuminations by wave fields having non-plane wave fronts are used. Our presentation is based on the assumption of an illumination by approximately plane wave fronts (stage b of stage 1: data by illumination angle). This strategy affords the advantage of being simple regarding its presentation as well as its implementation. This choice is however in no way limiting since the important point is to be able to predict the form of the wave fronts illuminating the target and to be able to take this a priori information into account.

Finally, according to another embodiment, the method is used to estimate the distribution of S impedances (and no longer of P impedances wherein the distribution of the propagation velocity of the S waves having already been estimated. Transposing the method to this purpose is immediate from the moment that a seismic source exciting the SH mode is available (which requires placing the source in a solid medium, as opposed to sources used in marine seismic surveys). In fact, the transverse displacement field (or displacement velocity) is still the solution to the wave equation that involves the S wave propagation velocity and the S impedance.

Advantages

Figure 7:
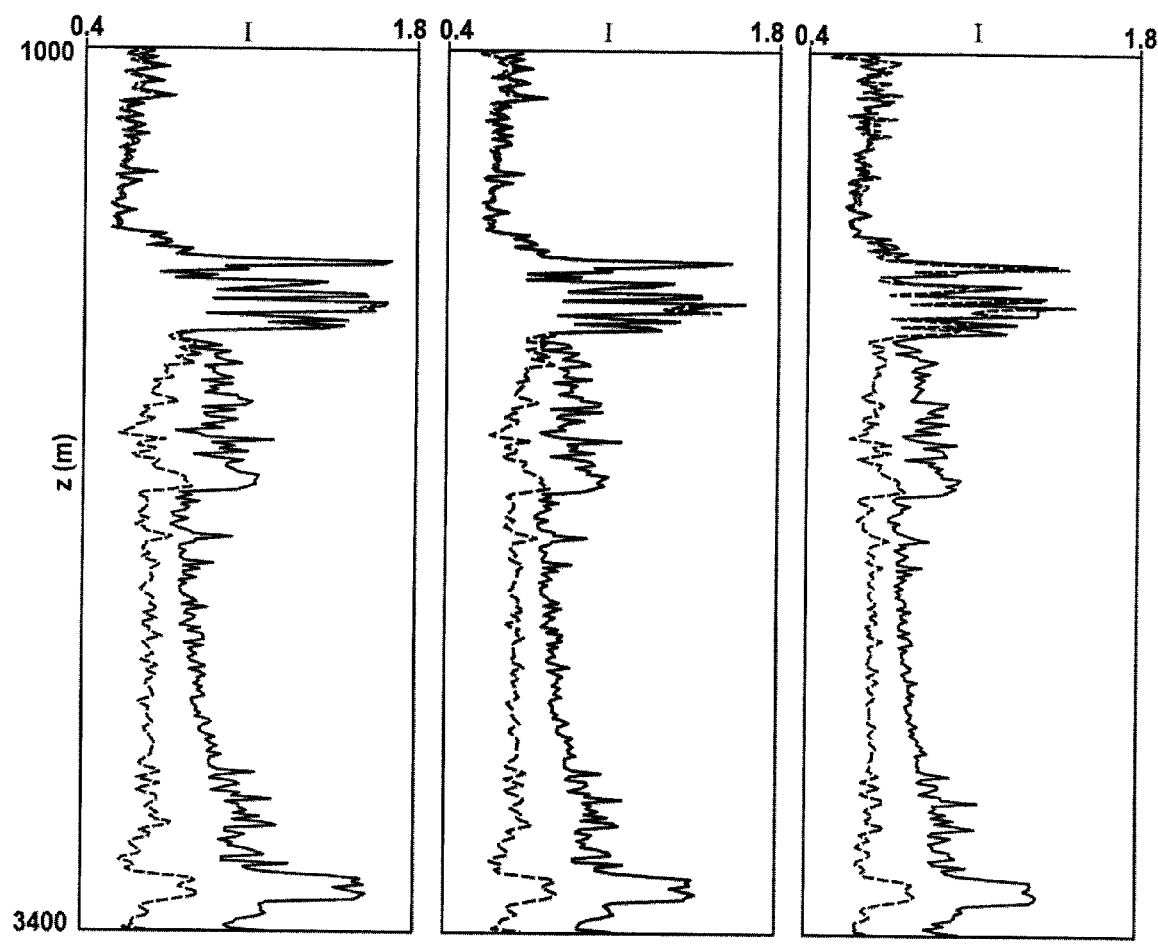
FIG. 7 compares three impedance profiles (I) extracted from FIGS. 3 and 6 for x=0, x=40 and x=200 m.
Figure 11:
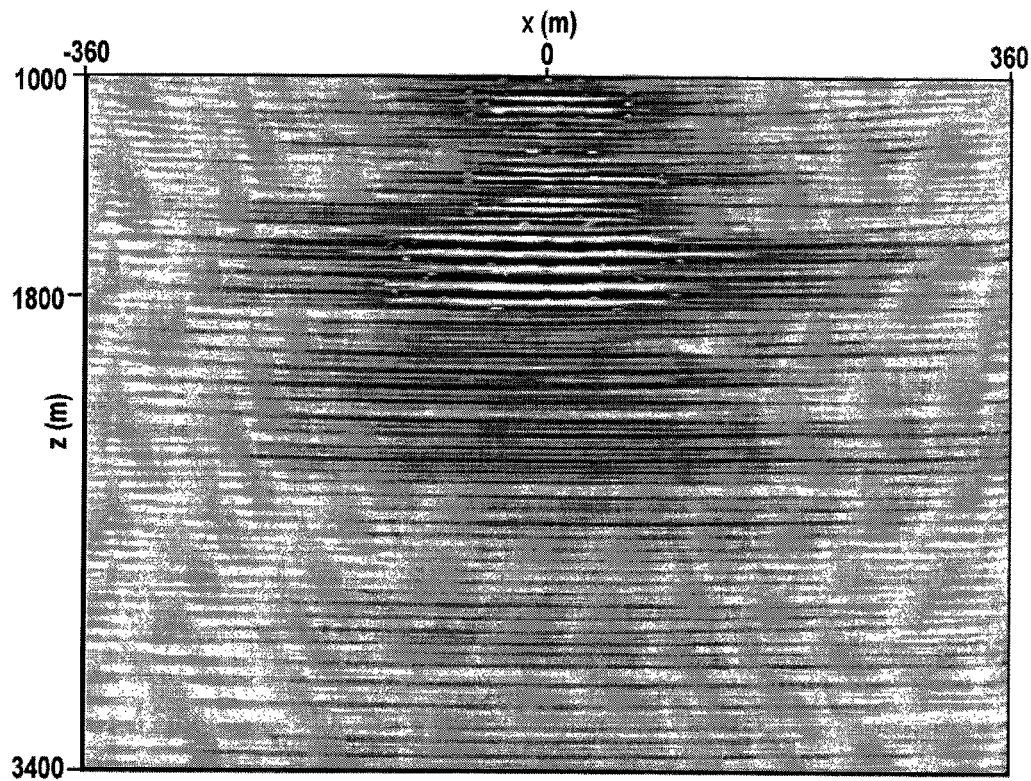
FIG. 11 shows the result obtained by pre-stack depth migration of the data.

The method according to the invention provides an image of the target area of the subsoil representing the estimated impedance distribution (FIG. 6). This result has both high resolution and is quantitative. The vertical resolution of the impedance distribution which is obtained provides in fact very detailed information on the distribution that is sought (FIG. 7). This vertical resolution is of a far higher standard than in conventional methods, such as the data migration presented in FIG. 11. FIG. 11 shows the result obtained by pre-stack depth migration of the data. The image contains distortions (curvature of the layers, events resulting from multiple reflection imaging) and it shows a vertical resolution that is of much lower quality than that of FIG. 6.

Figure 10:
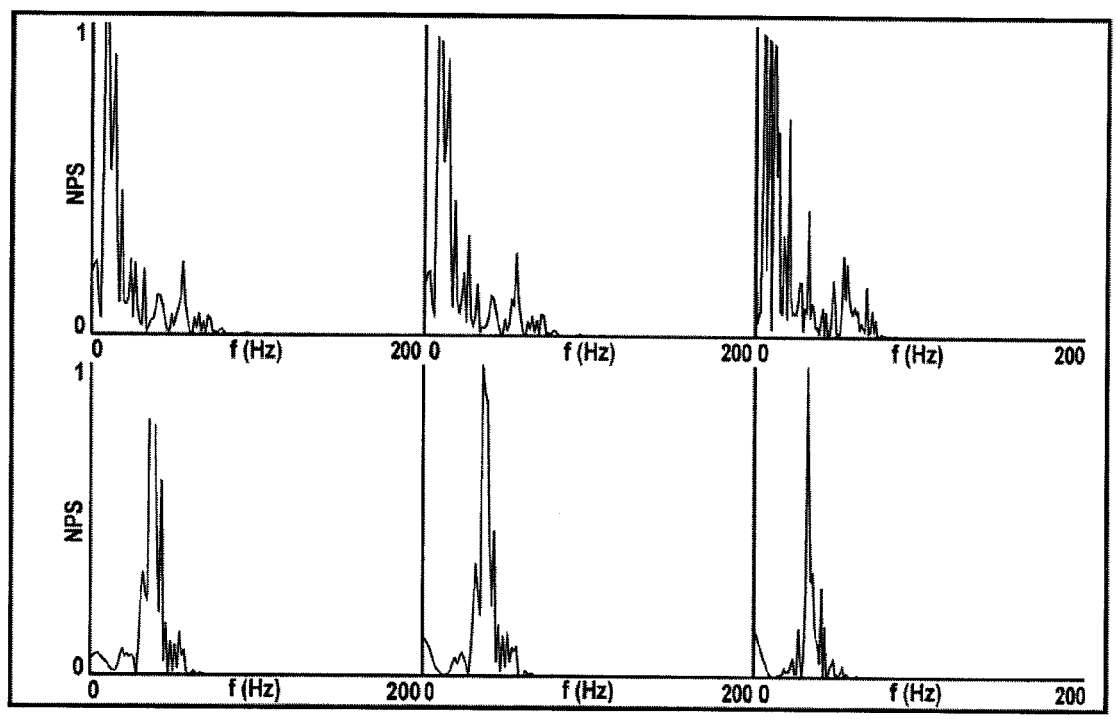
FIG. 10 compares the moduli of the Fourier transforms of the deep parts (i.e. for z from 2000 m to 3400 m) of the impedance profiles shown in FIG. 7 and of the corresponding traces of the migrated section.

The vertical resolution provided by the method depends on the depth range which is considered:
in the vicinity of the depth interval covered by the receivers, the resolution is essentially governed by the distance between two consecutive receivers,
below, the very low frequency components of the impedance distribution are lost, as is usual with seismic reflection methods, but the vertical resolution, even though it is not as good as above, remains exceptionally good and is greatly better than the resolution provided by conventional methods. In this deep part, the resolution gain is explained by the non-linear character of the inversion performed (whereas the conventional imaging techniques are linear). Modelling operator F is in fact non linear and this particular feature makes it capable of modelling multiple diffractions/reflections. In the case of deposits with a high vertical heterogeneity, as it is generally the case for sedimentary formations, the effects of multiple diffractions/reflections are great and taking them into account allows gaining in vertical resolution, and notably overcoming the limitation of the seismic frequency band inherent in conventional methods. The vertical resolution gain is illustrated in FIG. 10 (the resolution is characterized by the band width of the amplitude spectrum). FIG. 10 compares the moduli of the Fourier transforms of the deep parts (that is for z from 2000 m to 3400 m) of the impedance profiles shown in FIG. 7 and of the corresponding traces of the migrated section (after conversion of these results from a depth expressed in meter to a depth expressed in round-trip vertical propagation time). These Fourier transforms have been normalized so as to make the amplitudes of the highest peak, above 5 Hz, comparable. A very significant band width increase is observed, which reveals the vertical resolution gain that can be obtained by applying the invention.

Use

Lithologic or Petrophysical Interpretations

The interpretation in lithologic or petrophysical terms as the result of the invention provides invaluable information, in an exploration context as well as in a reservoir monitoring context. In fact, such an interpretation allows monitoring a geological acid gas storage site, or to locate and to assess oil reservoirs.

Use as a Complement to Logs

In order to better know the subsoil, geophysicists use measurements obtained in wells (logs, cores). These logs generally provide precise measurements, notably in terms of resolution, but whose relevance is limited to the immediate vicinity of the well (typically one meter). These measurements are essential to know the lithology and the petrophysical properties of the layers traversed.

The invention can be seen as a novel type of log, of course with a vertical resolution that is not as good as in conventional logs, but with the advantage of considerably widening the vicinity of the well investigated, and even of providing an estimation of the lateral variations within this vicinity.

As with logs, the result of the invention can be used as it is, or serve as input for seismic data processing and interpretation softwares (stratigraphic deconvolution, seismic data inversion).

Figure 12:
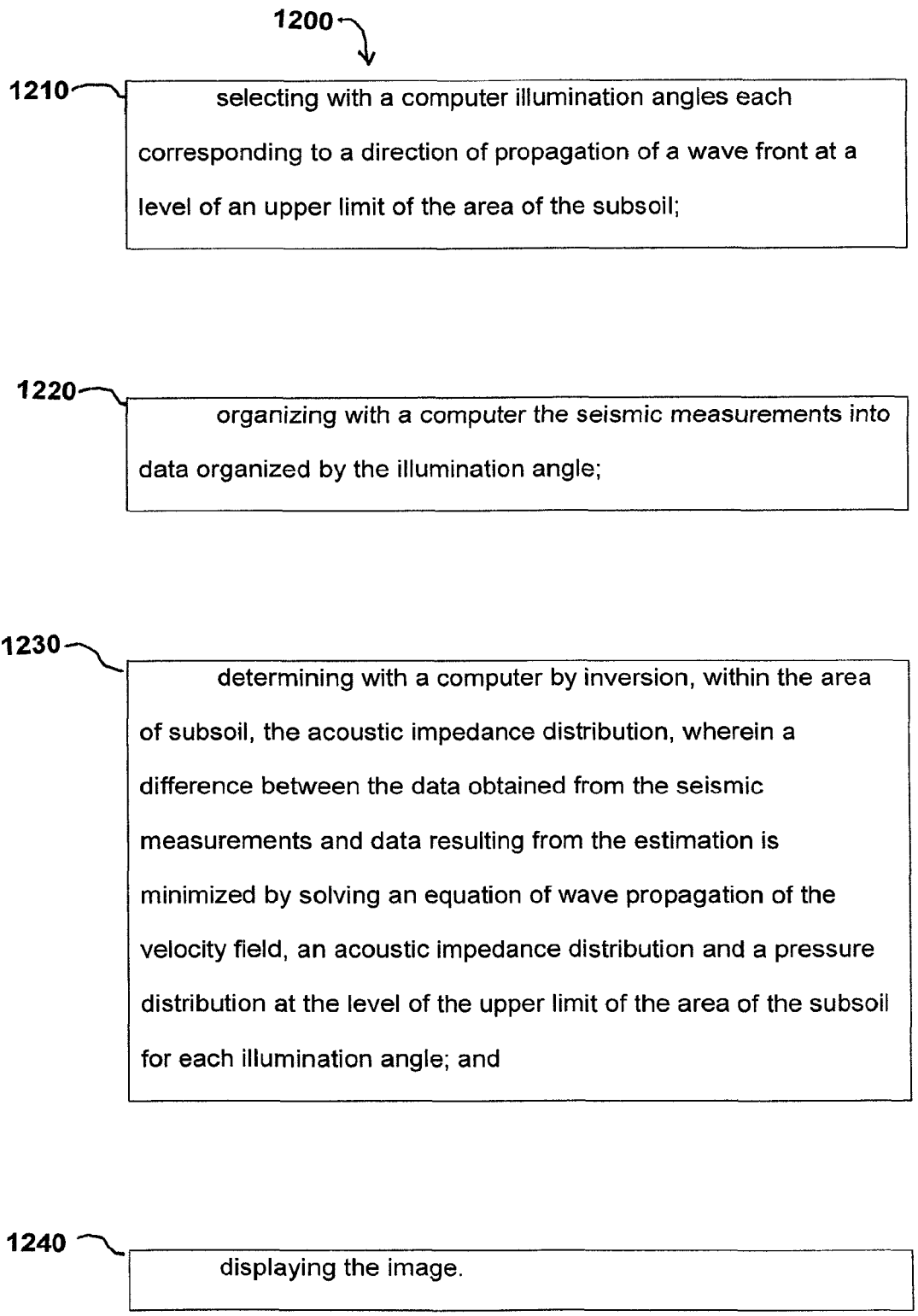
FIG. 12 is a flowchart of a method implemented with a programmed computer in accordance with the invention for constructing an image representative of an acoustic impedance distribution in an area of subsoil using seismic measurements acquired from an emission of seismic waves from a topsoil surface into the area of the subsoil and reception thereof by receivers positioned at different depths in at least one well, and from an estimation of a seismic wave propagating velocity field in the area of the subsoil.

FIG. 12 illustrates a method 200 implemented by a programmed computer for constructing an image representative of an acoustic impedance distribution in an area of subsoil using seismic measurements acquired from an emission of seismic waste from a topsoil surface into the area of the subsoil and reception area by receivers positioned at different depths and at least one well, and from an estimation of a seismic wave propagation field in an area of subsoil. If process 1200 starts with step 1210 of selecting with a computer illumination angles each corresponding to a direction of propagation of a wave front at a level of an upper limit of the area of the subsoil. The process proceeds to step 1200 of organizing with a computer the seismic measurements into data organized by the illumination angle; the process proceeds to step 1230 of determining with a computer by inversion, within the area of the subsoil, the acoustic impedance distribution wherein a difference between the data obtained from the seismic measurements and data resulting from the estimation is minimized by solving an equation of wave propagation of the velocity field, an acoustic impedance distribution and a pressure distribution at the level of the upper limit of the area of the subsoil for each illumination angle; and finally proceeds to step 1240 of displaying the image with any suitable display device.

Use in the Context of Reservoir Monitoring

In the context where walkaway data are acquired as a function of time, temporal variations of the impedance distribution estimated by the method of the invention can be exploited to detect changes in the petrophysical properties of the reservoir in order, for example, to optimize its production, or its coverage, so as to predict accident risks.

Finally, obtaining both a P impedance and an S impedance distribution provides information on the content of the fluid. This information is invaluable for underground reservoir and aquifer management. In particular the application to the joint inversion of seismic data in a context of repetitive seismic surveys and of production data is emphasized.

The invention claimed is:

1. A method implemented by a computer for constructing an image representative of an acoustic impedance distribution in an area of subsoil using seismic measurements acquired from an emission of seismic waves from a top soil surface into the area of the subsoil and reception thereof by receivers positioned at different depths in at least one well, and from an estimation of a seismic wave propagation velocity field in the area of the subsoil, comprising:

selecting with a computer illumination angles each corresponding to a direction of propagation of a wave front at a level of an upper limit of the area of the subsoil;

organizing with a computer the seismic measurements into data organized by the illumination angles;

determining with a computer by inversion, within the area of subsoil, the acoustic impedance distribution, wherein a difference between the data obtained from the seismic measurements and data resulting from the estimation is minimized by solving an equation of wave propagation of the velocity field, an acoustic impedance distribution and a pressure distribution at the level of the upper limit of the area of the subsoil for each illumination angle; and displaying the image.

2. A method as claimed in claim 1, wherein the difference is minimized by use of a priori information defined by a direction of a dip relating to the acoustic impedance distribution and a direction of a dip concerning the pressure distribution.

3. A method as claimed in claim 2, wherein the difference is minimized by minimizing a least-squares function comprising a first term measuring the difference, a second term corresponding to a directional derivative concerning the acoustic impedance distribution and weighted by a first weight, and a third term corresponding to a directional derivative concerning the pressure distribution and weighted by a second weight.

4. A method as claimed in claim 3, wherein the weights are determined by trial-and-error.

5. A method as claimed in claim 4, wherein the weights are determined by applying the following rules:

a result showing correlated residues which are too strong which express too strong a value of at least one of the two weights; and a result showing an acoustic impedance distribution with lateral variations expressing too strong a value assigned to the first weight.

6. A method as claimed in claim 1, wherein the difference is minimized by adding a term to the function to account for a priori information determined at a level of at least one well drilled through the area of the subsoil.

7. A method as claimed in claim 2, wherein the difference is minimized by adding a term to the function to account for a priori information determined at a level of at least one well drilled through the area of the subsoil.

8. A method as claimed in claim 3, wherein the difference is minimized by adding a term to the function to account for a priori information determined at a level of at least one well drilled through the area of the subsoil.

9. A method as claimed in claim 4, wherein the difference is minimized by adding a term to the function to account for a priori information determined at a level of at least one well drilled through the area of the subsoil.

10. A method as claimed in claim 5, wherein the difference is minimized by adding a term to the function to account for a priori information determined at a level of at least one well drilled through the area of the subsoil.

11. A method as claimed in claim 1, wherein the seismic data are converted to be organized by illumination angle by using a Radon transform.

12. A method as claimed in claim 2, wherein the seismic data are converted to be organized by illumination angle by using a Radon transform.

13. A method as claimed in claim 3, wherein the seismic data are converted to be organized by illumination angle by using a Radon transform.

14. A method as claimed in claim 4, wherein the seismic data are converted to be organized by illumination angle by using a Radon transform.

15. A method as claimed in claim 5, wherein the seismic data are converted to be organized by illumination angle by using a Radon transform.

16. A method as claimed in claim 6, wherein the seismic data are converted to be organized by illumination angle by using a Radon transform.

17. A method as claimed in claim 1, wherein the image is interpreted in lithologic and/or petrophysical terms to monitor a geologic acid gas storage site or to locate and to assess oil reservoirs.

18. A method as claimed in claim 2, wherein the image is interpreted in lithologic and/or petrophysical terms to monitor a geologic acid gas storage site or to locate and to assess oil reservoirs.

19. A method as claimed in claim 3, wherein the image is interpreted in lithologic and/or petrophysical terms to monitor a geologic acid gas storage site or to locate and to assess oil reservoirs.

20. A method as claimed in claim 4, wherein the image is interpreted in lithologic and/or petrophysical terms to monitor a geologic acid gas storage site or to locate and to assess oil reservoirs.

21. A method as claimed in claim 5, wherein the image is interpreted in lithologic and/or petrophysical terms to monitor a geologic acid gas storage site or to locate and to assess oil reservoirs.

22. A method as claimed in claim 6, wherein the image is interpreted in lithologic and/or petrophysical terms to monitor a geologic acid gas storage site or to locate and to assess oil reservoirs.

23. A method as claimed in claim 7, wherein the image is interpreted in lithologic and/or petrophysical terms to monitor a geologic acid gas storage site or to locate and to assess oil reservoirs.

24. A method as claimed in claim 11, wherein the image is interpreted in lithologic and/or petrophysical terms to monitor a geologic acid gas storage site or to locate and to assess oil reservoirs.

25. A method as claimed in claim 1, wherein the image is used as a complement to other logs for characterizing area of subsoil.

* * * * *